US008365684B2

(12) United States Patent
Lalor

(10) Patent No.: US 8,365,684 B2
(45) Date of Patent: Feb. 5, 2013

(54) REMOTE CONTROL SYSTEM FOR CONTROLLING A REMOTE ANIMAL COLLAR

(75) Inventor: Tom Lalor, North Vancouver (CA)

(73) Assignee: Apline Trust, North Vancouver (CA)

( * ) Notice: Subject to any disclaimer, the term of this patent is extended or adjusted under 35 U.S.C. 154(b) by 1346 days.

(21) Appl. No.: 12/030,549

(22) Filed: Feb. 13, 2008

(65) Prior Publication Data

US 2009/0199786 A1 Aug. 13, 2009

(51) Int. Cl.
*A01K 15/02* (2006.01)

(52) U.S. Cl. ........................................ 119/720

(58) Field of Classification Search ............ 119/720, 119/712, 719
See application file for complete search history.

(56) References Cited

U.S. PATENT DOCUMENTS

| | | | |
|---|---|---|---|
| 2,800,104 A * | 7/1957 | Cameron et al. ............... 119/720 |
| 3,183,618 A | 5/1965 | Flewellen |
| 3,336,530 A * | 8/1967 | Sloan et al. ................... 342/386 |
| 3,608,524 A | 9/1971 | Waltz |
| 4,095,163 A | 6/1978 | Montague |
| 4,539,937 A | 9/1985 | Workman |
| 4,626,848 A | 12/1986 | Ehlers |
| 4,802,482 A | 2/1989 | Gonda et al. |
| 4,996,945 A | 3/1991 | Dix, Jr. |
| 5,425,330 A | 6/1995 | Touchton et al. |
| 5,448,847 A | 9/1995 | Teetzel |
| 5,584,137 A | 12/1996 | Teetzel |
| 5,606,306 A | 2/1997 | Mutoh et al. |
| 5,666,908 A | 9/1997 | So |
| 5,857,433 A | 1/1999 | Files |
| 5,905,623 A | 5/1999 | McCartney |
| 6,019,066 A * | 2/2000 | Taylor ........................... 119/720 |
| 6,116,201 A | 9/2000 | LaBelle |
| 6,297,731 B1 | 10/2001 | Flick |
| 6,327,999 B1 | 12/2001 | Gerig |
| 6,431,122 B1 * | 8/2002 | Westrick et al. ............... 119/721 |
| 6,459,378 B2 | 10/2002 | Gerig |
| 6,519,083 B2 | 2/2003 | Heinrich |
| 6,598,563 B2 | 7/2003 | Kim |
| 6,624,758 B1 | 9/2003 | Omata et al. |
| 6,725,810 B2 | 4/2004 | Schwartz |
| 6,726,072 B2 | 4/2004 | Rugh |
| 6,799,537 B1 | 10/2004 | Liao |
| 6,813,025 B2 | 11/2004 | Edwards |
| 6,830,014 B1 | 12/2004 | Lalor |
| 6,886,287 B1 | 5/2005 | Bell |
| 2002/0050249 A1 | 5/2002 | Grisley et al. |
| 2002/0079909 A1 | 6/2002 | Reeves |
| 2003/0110675 A1 | 6/2003 | Garrett |
| 2003/0116101 A1 | 6/2003 | Kim et al. |
| 2003/0226305 A1 | 12/2003 | Burnett |

(Continued)

FOREIGN PATENT DOCUMENTS

AU 2005100421 A4 6/2005
WO WO 96/39679 12/1996

*Primary Examiner* — Kristen C Hayes
(74) *Attorney, Agent, or Firm* — Jeffrey S. Sokol

(57) ABSTRACT

A remote control system is disclosed for controlling a remote animal collar of the type which includes one or more electrodes or sensors which protrude from the inside surface of the collar for contacting the neck of the animal and electronic devices located within the body of the collar to receive electronic control signals or sensor input and to generate a stimulus, which is transmitted to the animal through the electrodes or by a speaker or other devices on the collar. The remote control system uses a master and slave remote transmitter combination.

13 Claims, 1 Drawing Sheet

U.S. PATENT DOCUMENTS

| | | |
|---|---|---|
| 2005/0024226 A1 | 2/2005 | Hayes et al. |
| 2005/0145201 A1 | 7/2005 | Gillis et al. |
| 2005/0162282 A1 | 7/2005 | Dresti et al. |
| 2005/0172912 A1 | 8/2005 | Crist et al. |
| 2005/0217606 A1 | 10/2005 | Lee et al. |
| 2006/0164383 A1 | 7/2006 | Machin et al. |
| 2006/0169222 A1 | 8/2006 | Gerig |
| 2006/0181428 A1 | 8/2006 | Blaker et al. |
| 2007/0022994 A1 | 2/2007 | Moskun |
| 2007/0080934 A1 | 4/2007 | Chen et al. |
| 2007/0214698 A1 | 9/2007 | Hung |
| 2007/0221139 A1 | 9/2007 | Reinhart |
| 2008/0028663 A1 | 2/2008 | Day |
| 2008/0055147 A1 | 3/2008 | Van |
| 2008/0068207 A1 | 3/2008 | Elberbaum |
| 2008/0157983 A1 | 7/2008 | Dir et al. |
| 2008/0165249 A1 | 7/2008 | DeKeyser |
| 2008/0236514 A1* | 10/2008 | Johnson et al. ............... 119/719 |
| 2009/0249677 A1* | 10/2009 | Lalor .................................. 43/1 |
| 2009/0287363 A1 | 11/2009 | Young |

* cited by examiner

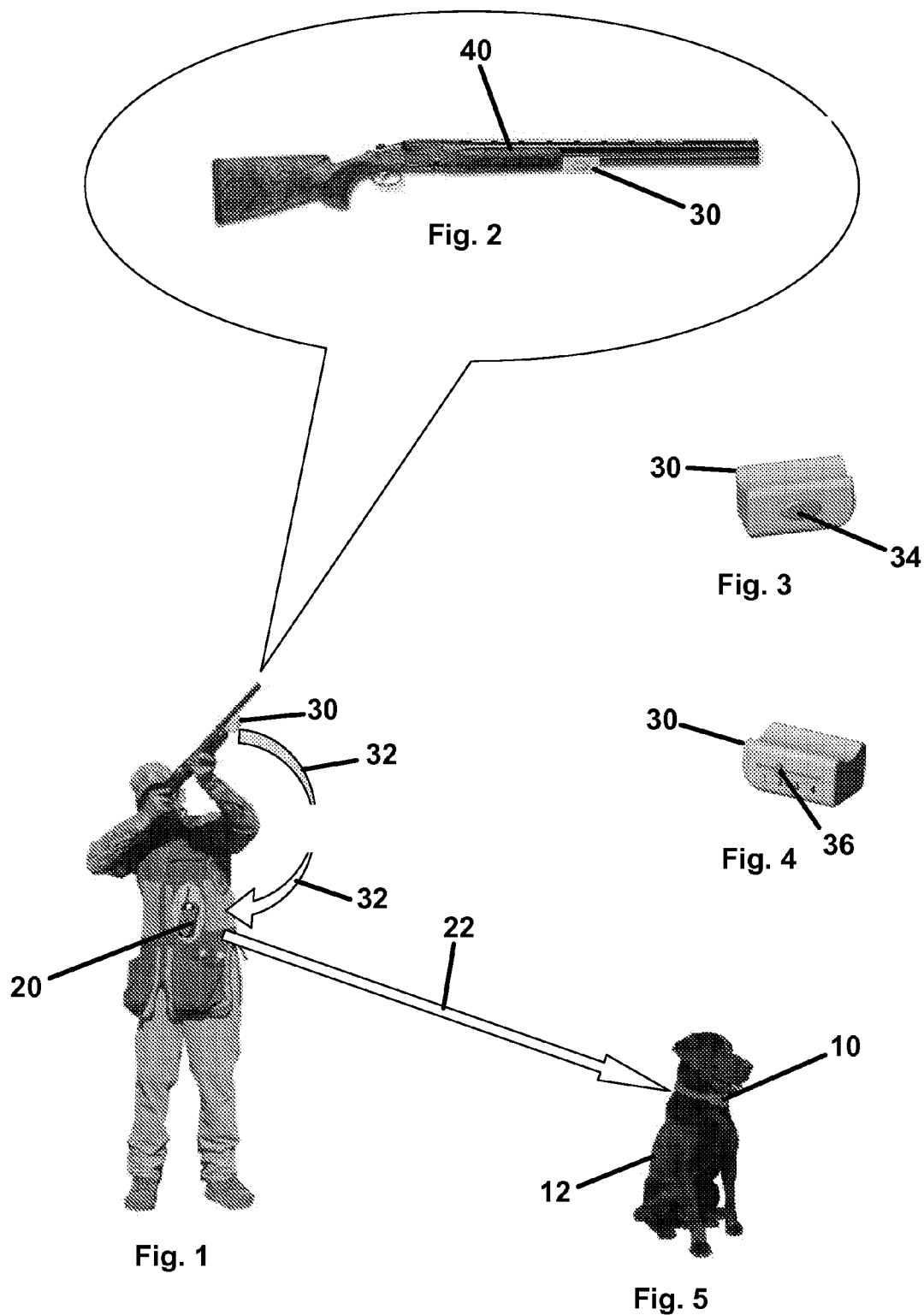

REMOTE CONTROL SYSTEM FOR CONTROLLING A REMOTE ANIMAL COLLAR

FIELD

The present invention relates to a remote controlled system for controlling remote animal collars of the type which include one or more electrodes or sensors which protrude from the inside surface of the collar for contacting the neck of the animal and electronic devices located within the body of the collar to receive electronic control signals or sensor input and to generate a stimulus, which is transmitted to the animal through the electrodes or by a speaker or other devices on the collar. In particular, the invention relates to a remote control system for controlling remote animal collars of this type which uses a master and slave remote transmitter combination.

BACKGROUND

Hunters and animal trainers require easier ways to control their animals while hunting and training. Remote controlled collars are therefore convenient and well known, permitting the hunter or trainer to remotely activate stimulation devices such as electrodes or speakers mounted on the collar. However, the remote transmitters for such remote controlled collars are bulky and can be difficult for the hunter or trainer to handle in an active field situation.

For example, in a hunting situation, a dog will often become conditioned by the movement of the hunter's weapon as he gets ready to shoot. The dog learns that once the weapon is raised what follows is gunfire and a bird falling. However, this conditioning may cause the dog to "break" or "go before commanded". Such "breaking" is a problem because the dog's movement causes the birds to flare up and spoil the shoot. In some cases, the dog may even chase the birds before they are shot. To correct this problem, hunters often use remote controlled electronic collars of the kind described above to stop the dog from moving as the hunter's gun moves or the birds flush. However, it is almost impossible to correct the dog in time with a bulky remote control transmitter located in the hunter's pocket, since the hunter has to let go of his gun, find the remote transmitter, get it out of his pocket, and then find and press the correct button.

One solution is described in U.S. Pat. No. 6,830,014 to Lalor, the disclosure of which is incorporated herein by reference. Lalor discloses a remote control transmitter that includes a vibration sensor, thereby permitting remote control signals to be sent to the animal collar by tapping the remote transmitter. Lalor also discusses using voice recognition circuits to control the remote transmitter. These solutions have disadvantages. The former still requires that the hunter have at least one hand free to control the remote transmitter. In a hunting situation or other activities, the hunter's hands may be occupied with other devices such as guns, game calls, leashes or various combinations of such devices, and it may be difficult to access the master transmitter in time to make an animal correction. In the latter solution, the use of verbal commands in a hunting situation may not be suitable as any sound could scare the hunted prey.

Accordingly, there is a need for a remote control system that can be used to control a remote animal collar that solves the problems presented by the existing devices. There is a need for a remote control system that can be activated without sound and without the hunter or trainer having to remove his hands from his weapon.

SUMMARY

The applicant's present remote control system as described herein addresses the above problems by providing a remote control system for controlling a remote animal collar, the animal collar comprising one or more stimulation devices for providing stimulation to the animal and receiver circuits for receiving master control signals for controlling the stimulation devices, the remote control system comprising: a slave transmitter for transmitting slave control signals; and a master transmitter for receiving the slave control signals and for transmitting the master control signals to the animal collar for controlling the stimulation devices.

In other aspects, the master transmitter may have a transmission range of up to about one mile and the slave transmitter may have a transmission range of up to about 30 feet. The slave transmitter is advantageously sufficiently small in size so that it may be mounted on a portable device such as a hand held hunting weapon, a key chain, a handling stick, a watch, or any other similar device. The slave transmitter may include an animal collar selector switch for selecting between one of multiple animal collars to control and a keypad for selecting a type, a level and/or a duration of the stimulation. The slave transmitter may be adapted for mounting in a convenient location on the portable device held by a user so that the user may easily activate the slave transmitter to send the slave control signals without releasing the user's hold on the portable device.

It is to be understood that other aspects of the present remote control system will become readily apparent to those skilled in the art from the following detailed description, wherein various embodiments are shown and described by way of illustration. As will be realized, the remote control system is capable of other and different embodiments and its several details are capable of modification in various other respects, all without departing from the spirit and scope of the remote control system described. Accordingly, the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the applicant's remote control system are illustrated by way of example, and not by way of limitation, in detail in the figures, wherein:

FIG. 1 shows a hunter with a master transmitter located in his pocket and a slave transmitter located on his weapon;

FIG. 2 shows the slave transmitter mounted to a weapon;

FIG. 3 shows one side of the slave transmitter;

FIG. 4 shows a second side of the slave transmitter; and

FIG. 5 shows an animal wearing an electronic remote controlled collar.

DETAILED DESCRIPTION

The applicant's remote control system will now be described with reference to specific embodiments. With reference to FIGS. 1 to 5, the applicant's remote control system is advantageous for use in controlling remote animal collars such as remote collar 10 shown affixed to an animal 12 in FIG. 5. The remote animal collar 10 may include one or more electrodes or sensors which protrude from the inside surface of the collar for contacting the neck of the animal and electronic devices located within the body of the collar to receive electronic master control signals or sensor input and to generate a stimulus, which is transmitted to the animal through the electrodes, or by a speaker or a spray device located on the collar. The remote animal collar 10 includes a power supply.

As shown in FIG. 1, the applicant's remote control system includes a master transmitter 20 for sending electronic master control signals 22 to be received by the remote animal collar 10 to control the type, amount and duration of the stimulus given to the animal. The master control signals 22 may be in the form of radio frequency signals, infrared signals or any other suitable control signals. The master transmitter 20 includes high power circuits capable of transmitting electronic master control signals to the remote animal collar 10 at a frequency of about 27 Mhz (or some other suitable frequency), to a range of up to about one mile. The master transmitter includes a micro processor, a keypad with buttons for controlling the type, level and duration of stimulation of the remote collar 10, a battery supply and slave receiver circuits for receiving electronic slave control signals 32 from a slave transmitter 30 (also shown in FIG. 1). Master transmitter 20, may be used without the slave transmitter 30 to control the animal collar 10.

As shown in FIGS. 1 and 2, the slave transmitter 30, is used for sending electronic slave control signals 32 to the master transmitter 20. The slave transmitter 30 may be mounted on the barrel of a gun 40, for easy access by the hunter. The slave transmitter 30 is low-powered, since it only needs to communicate a few feet to the master transmitter 20 located in the hunter's pocket, and therefore can be made small and light. It may be mounted on the hunter's gun 40 as shown in FIGS. 1 and 2, but also may be located in a convenient place on the hunter's clothing, on a key chain, on a handling stick, or mounted on the hunter's hand or watch or other similar devices. The slave transmitter 30 requires only a very small battery, low-powered communication circuits, and limited software, since its only purpose is to communicate a short distance to the master transmitter 20. The slave transmitter 30 may operate at a frequency of about 27 Mhz (or some other suitable frequency) to a range of up to about 30 feet. Slave transmitter 30 may have a key pad (not shown) with multiple buttons for controlling multiple types, levels and duration of stimulation or it may have a single button 34 to active stimulation control, and an animal collar selector switch 36 for selection of one of several remote animal collars 10.

In operation, when the hunter needs to modify the behavior of the animal for any reason, the selector 36 on slave transmitter 30 is set to the desired animal collar, and the key pad or button 34 is pressed to issue slave control signals 32. The slave control signal is transmitted the short distance from the slave transmitter 30 to the mater transmitter 20, which receives the slave control signal, and in turn transmits the master remote control signal 22 to the remote animal collar 10 corresponding to the level, type and duration of stimulation selected by the hunter.

Because the master remote control signal 22 is initiated by the slave control signal 32 issued by the slave transmitter 30 mounted on the hunter's weapon, the hunter need not remove his hands from his weapon to issue a correction stimulation to the animal to prevent "breaking".

The previous detailed description is provided to enable any person skilled in the art to make or use the present remote control system for controlling a remote animal collar. Various modifications to those embodiments will be readily apparent to those skilled in the art, and the generic principles defined herein may be applied to other embodiments without departing from the spirit or scope of the remote control system described herein. Thus, the present remote control system is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

I claim:

1. A remote control system controlling a remote animal collar, the remote animal collar comprising one or more stimulation devices for providing a stimulation to the animal and animal collar receiver circuits receiving master control signals for controlling the stimulation devices, the remote control system comprising:
a slave transmitter having slave transmitter circuits; and
a master transmitter having master receiver circuits and master transmitter circuits,
wherein said slave transmitter circuits transmit slave control signals corresponding to at least one of a selected type, a selected level, and a selected duration of the stimulation to said master transmitter;
and wherein said master receiver circuits receive said slave control signals from said slave transmitter and said master transmitter circuits transmit the master control signals to the remote animal collar for controlling the stimulation devices, the master control signals corresponding to said at least one of said selected type, said selected level and said selected duration of the stimulation in accordance with slave control signals.

2. The remote control system of claim 1, wherein the master transmitter has a transmission range that is longer than the transmission range of the slave transmitter.

3. The remote control system of claim 2, wherein the master transmitter has a transmission range of up to about one mile.

4. The remote control system of claim 2, wherein the slave transmitter has a transmission range of up to about 30 feet.

5. The remote control system of claim 1, wherein the slave transmitter is mountable on a portable device.

6. The remote control system of claim 5, wherein the slave transmitter is adapted for mounting in a convenient location on the portable device held by a user so that the user may easily activate the slave transmitter to send the slave control signals without releasing the user's hold on the portable device.

7. The remote control system of claim 1, wherein the slave transmitter includes an animal collar selector switch for selecting between one of multiple animal collars to control.

8. The remote control system of claim 1, wherein the slave transmitter includes a keypad for selecting a type of the stimulation.

9. The remote control system of claim 1, wherein the slave transmitter includes a keypad for selecting a level of the stimulation.

10. The remote control system of claim 1, wherein the slave transmitter includes a keypad for selecting a duration of the stimulation.

11. The remote control system of claim 1, wherein the slave transmitter is mounted on a portable device.

12. The remote control system of claim 5, wherein the portable device is selected from any one of a hand held hunting weapon, a key chain, a handling stick, or a watch.

13. A remote control system for controlling an animal, the remote control system comprising:
- an animal collar for attachment to the animal, said animal collar comprising at least one stimulation device for providing a stimulation to the animal and animal collar receiver circuits for receiving master control signals for controlling said at least one stimulation device;
- a slave transmitter having slave transmitter circuits; and
- a master transmitter having master receiver circuits and master transmitter circuits,
- wherein said slave transmitter circuits transmit slave control signals corresponding to at least one of a selected type, a selected level, and a selected duration of said stimulation to said master transmitter,
- and wherein said master receiver circuits receive said slave control signals from said slave transmitter and said master transmitter circuits transmit said master control signals to said animal collar for controlling said at least one stimulation device, the master control signals corresponding to said at least one of said selected type, said selected level and said selected duration of said stimulation in accordance with said slave control signals.

* * * * *